United States Patent

[11] 3,623,971

| [72] | Inventor | Clement W. Bowman<br>Corunna, Ontario, Canada |
|---|---|---|
| [21] | Appl. No. | 886,763 |
| [22] | Filed | Dec. 19, 1969 |
| [45] | Patented | Nov. 30, 1971 |
| [73] | Assignees | Cities Service, Ltd.<br>Calgary, Alberta, Canada;<br>Imperial Oil Limited; Altantic Richfield Corporation; Royalite Oil Company, Limited, , part interest to each |

[54] USE OF CARBONATES AS pH CONTROLLER
9 Claims, No Drawings

[52] U.S. Cl. .................................................. 208/11
[51] Int. Cl. ................................................... C10g 1/04
[50] Field of Search ........................................ 208/11

[56] References Cited
UNITED STATES PATENTS

| 2,957,818 | 10/1960 | Fischer .......................... | 208/11 |
| 3,075,913 | 1/1963 | Scheffel et al. ................ | 208/11 |
| 3,401,110 | 9/1968 | Floyd et al. ................... | 208/11 |
| 3,487,003 | 12/1969 | Baillie et al. .................. | 208/11 |

*Primary Examiner*—Curtis R. Davis
*Attorney*—J. Richard Geaman

ABSTRACT: The process described involves recovery of bitumen from bituminous sand in which the bituminous sand is slurried with a fluid, usually water, the resulting slurry is introduced into a separation zone containing a body of water and bitumen is floated to the top of the body of water and recovered therefrom in the form of a bituminous emulsion. The pH of the system is controlled and processability improved by the addition of calcium carbonate in amounts between about 0.01 and about 1.0 weight percent. The use of calcium carbonate is especially beneficial in situations where bituminous sands are exposed to the atmosphere for a substantial period of time before being treated for recovery of bitumen therefrom. In such instances, calcium carbonate is preferably applied to the bituminous sand immediately following exposure to the atmosphere and serves to prevent undesirable reduction of pH of the sand prior to further treatment.

USE OF CARBONATES AS PH CONTROLLER

This invention relates to an improved process for the recovery of bitumen from bituminous sand in processes of the type in which bituminous sand is slurried with a fluid, the resulting slurry is introduced into a separation zone containing a body of water and bitumen is floated to the top of the body of water and recovered therefrom in the form of a bituminous emulsion.

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca district of the Province of Alberta, Canada.

Typically, the composition of these sands by weight is: from about 5 to about 20 percent of oil; from about 1 to about 10 percent of water; and from about 70 to about 90 percent of inorganic solids. The specific gravity of the bitumen varies from about 1.0 to about 1.05. (The specific gravity of the bitumen as well as all other values of specific gravity given herein are taken at 60° F.) The major portion of the inorganic solids, by weight, is fine grain quartz sand having a particle size greater than about 45 microns and less than 2,000 microns. The remaining inorganic solid matter has a particle size of less than 44 microns and is referred to as fines. The fines content typically varies from about 5 to about 30 percent by weight of the solid inorganic content of bituminous sand. However, the composition of bituminous sand can vary from the above-mentioned ranges and this is not too uncommon. Also, in mining the bituminous sand, clay which is found in layers of varying thickness in such sand areas, may be admixed with the bitumen, thus increasing the inorganic solids content and particularly the fines content of the material to be processed.

Various methods have been proposed for separating bitumen from bituminous sand. The two best known methods are often referred to as the "hot water method" and the "cold water method." In the former, the bituminous sand is jetted with steam or hot water and mulled with a small proportion of water at about 175° F., and the pulp is then dropped into a turbulent stream of circulating water and carried through a separation cell maintained at an elevated temperature of about 180° F. In the separation cell, entrained air causes the oil to rise to the top in the form of a froth rich in bitumen which is then drawn off. Sand settles to the bottom and may be removed therefrom.

The so called "cold water method" does not involve heating the bituminous sand other than whatever heating might be required to conduct the operation at room temperature. The process involves mixing the bituminous sand with water, soda ash and an organic solvent such as kerosene. The mixture is then permitted to settle at room temperature. A mixture of water and bitumen dissolved in the organic solvent rises to the top of the settling zone and is recovered.

In the recovery of bitumen using extraction processes such as the hot water process described above, it is recognized that a slightly alkaline pH is desirable for most efficient operation of the process and maximum recovery of bitumen. Use of various additives to control pH during processing of the tar sands in such extraction processes is well known. Of the various additives suggested for pH control, sodium hydroxide is perhaps the most common.

Much of the bituminous sand available for treatment in extraction processes for recovery of bitumen is relatively near the surface of the earth and can be most efficiently obtained by removal of overburden and the use of surface mining techniques. In operations of this type, it is usually necessary to remove overburden first and then at a later date mine the tar sand for processing. Unfortunately, experience has shown that bituminous sand exposed to the atmosphere for any significant length of time shows a progressive decrease in pH. In addition, some bituminous sands, particularly those near the top of a deposit, have an undesirably low in situ pH even when first exposed to the atmosphere. Low pH resulting from either or both of these situations results in low bitumen recovery and poor froth quality when bituminous sand is treated in extraction processes such as the hot water process. Addition of pH controlling additives to the processing can alleviate the situation somewhat but it is known that the the pH of bituminous sand has decreased due to exposure to the atmosphere only part of the adverse results of such deterioration can be overcome by pH control during processing of the sand.

It has now been found that addition of calcium carbonate to bituminous sand is extremely beneficial in controlling the pH of the sand both before and during treatment for recovery of bitumen therefrom and also in increasing the processability of the bituminous sand. The use of calcium carbonate is particularly beneficial in preventing deterioration of bituminous sands exposed to the atmosphere before processing for recovery of bitumen.

In accordance with the present invention, calcium carbonate is usually added to aid in extraction processing of bituminous sands in amounts between about 0.01 and about 1.0 weight percent based on total weight of bituminous sand with the use of amounts in the range between about 0.02 and about 0.1 weight percent being preferred. The use of calcium carbonate, preferably in powder form to accelerate the reaction, will normally maintain or adjust the pH of the bituminous sand to within the range of between about 7 to about 8.5. If slightly higher pH values are desired, conventional pH controlling additives such as sodium hydroxide may be added during processing of the bituminous sand.

Temperatures used in practicing the hot water process described above frequently include the range of between about 160 and about 200° F., but it should be understood that the improved results derived from use of calcium carbonate as described herein are not dependent upon temperature and any suitable temperatures such as those from about 60° to about 200° F. may be used in extraction processes using calcium carbonate.

As mentioned above, use of calcium carbonate in accordance with the invention is particularly beneficial in preserving the quality of bituminous sand exposed to the atmosphere a significant length of time before being treated for recovery of bitumen therefrom. Once exposed to the atmosphere by removal of overburden, bituminous sand deposits age fairly rapidly. Normal commercial operations will involve extraction treatment of bituminous sand which has been exposed to the atmosphere for periods of time ranging from a period of a few weeks up to as much as about 2 years. During this time, pH of the sand may deteriorate from the average 7 to 8 pH range of freshly exposed sand to a pH as low as 3 to 5. Significant deterioration of pH frequently occurs to depths as great as about 10 feet below the surface of the deposit. Since the harm done by deterioration of pH in these circumstances cannot be completely undone merely by addition of pH controlling additives during extraction processing, it becomes highly important to protect exposed bituminous sand from deterioration of pH over substantial periods of time. The use of conventional pH controlling additives for this purpose would be prohibitively expensive. Such additives are highly soluble in water and if put on a surface of exposed tar sand or even mixed into the tar sand would leach out fairly rapidly leaving the sand unprotected against future deterioration of pH. Calcium carbonate, on the other hand, is relatively insoluble in water and is capable of affording long-term protection. Calcium carbonate used for protection of exposed bituminous sand deposits is preferably in the form of discrete particles of limestone between about one-eighth inch and 1 inch in size to provide the desired long-term pH protection. This material can conveniently be distributed on the surface of exposed bituminous sand deposits shortly after removal of overburden or, if desired, may be raked or otherwise mixed into the upper portion of the exposed deposits. The use of crushed limestone is especially convenient in treating exposed deposits of bituminous sand because such deposits frequently overlie limestone formations which provide a cheap, convenient source of limestone. Calcium carbonate spread on the surface of or mixed into the upper portions of an exposed deposit of bituminous sand to restore or prevent deterioration of pH is preferably applied at rates between about 0.01 and about 1.0 pounds of calcium carbonate per square foot of surface area of the deposit, more usually between about 0.05 and about 0.5 pounds per square foot (lb./ft.$^2$). The amount required will vary somewhat according to the nature of the deposit, the time for which protection is desired and the amount of calcium carbonate which it may be desired to have in the sand at the time of processing for extraction of bitumen.

A further advantage of the use of calcium carbonate rather than other pH controlling agents is that an excess of polyvalent ions such as calcium is generally harmful to efficient operation of the extraction process. Because of its relatively low solubility, calcium carbonate releases ions much more slowly than other, more soluble additives. That is, as mentioned above, of particular advantage for long-term protection of exposed deposits of bituminous sand.

While calcium carbonate may be added to bituminous sands at any time before or during extraction processing, it is preferred, for best results, that the calcium carbonate be added to the surface of or mixed into the bituminous sands from which overburden has been removed within 1 month and preferably within 1 week after removal of overburden. The use of calcium carbonate is considered especially beneficial where it is applied to the bituminous sand at least a week and preferably at least a month before the bituminous sand is subjected to extraction processing for recovery of bitumen.

While preferred amounts of calcium carbonate for use in practicing the invention are described above, it should be understood that the upper limit of about 1.0 weight percent mentioned above is more a matter of economics than a limitation on operability. Due to the limited solubility of calcium carbonate in bituminous sand and bituminous sand slurries, it is generally not harmful to add excess amounts of calcium carbonate.

The following examples will illustrate the advantages of the present invention in maintaining desired pH levels and improving processability of typical bituminous sands.

EXAMPLE 1

Overburden was removed from portions of a typical deposit of bituminous sand suitable for feed to a commercial extraction process and calcium carbonate in the form of crushed limestone was spread over a portion of the freshly uncovered deposit. Samples were taken of material at a depth of 5 feet to obtain information concerning the pH of the deposit immediately following removal of overburden and after various periods of time. It was found that an untreated portion of the deposit deteriorated It was found that an untreated portion of the deposit deteriorated from an initial pH of 7.25 to a pH of 6.0 after only 4 months of exposure to the atmosphere and to a pH of 4.75 after 2 years. By contrast, the portion of the deposit treated with calcium carbonate had a pH of 7.77 after 1 year. In this test, calcium carbonate was applied at a rate of approximately 0.1 lb./ft.$^2$ of surface area of exposed bituminous sand.

EXAMPLE 2

To illustrate the effect of addition of calcium carbonate on the pH of bituminous sand, varying amounts of calcium carbonate were added to samples of bituminous sand which had been exposed to the atmosphere for long periods of time and had a pH of only 3.4. Addition of varying amounts of calcium carbonate increased the pH of the bituminous sand as follows:

| Wt.% CaCo$_3$ Added | pH |
|---|---|
| 0 | 3.4 |
| 0.05 | 6.6 |
| 0.07 | 6.9 |
| 0.50 | 7.6 |

EXAMPLE 3

To illustrate the advantages of adding calcium carbonate to slurries of bituminous sand being treated by the hot water process for recovery of bitumen, two different samples of a bituminous sand comprising 11.36 weight percent bitumen, 4.43 weight percent water and 84.21 weight percent solids were treated by a bench scale hot water type process for recovery of bitumen. The bituminous sand had an initial pH of 4.5.

In these tests, about 500 grams of each sample of bituminous sand was slurried with 150 milliliters of water at 180° F. for about 10 minutes and simultaneously aerated. Next the slurry was flooded with water at a temperature of about 180° F. and stirred, without aeration, for about 10 minutes to separate the bituminous froth formed from the water-sand slurry. This froth was then removed and analyzed.

For the first run, no additives were used. Results of this run included a recovery in the froth of 41 percent of the bitumen present in the original bituminous sand. The froth contained 69.2 pounds of solids per hundred pounds of bitumen and 56.3 pounds of water per hundred pounds of bitumen. In the second run, 0.68 weight percent calcium carbonate was added to the slurry, raising the pH of the slurry from 4.5 to 7.2. In this run, 78.9 percent of the bitumen was recovered in the froth and the froth contained only 29.8 pounds of solids per hundred pounds of bitumen and 48.6 pounds of water per hundred pounds of bitumen.

EXAMPLE 4

To further illustrate the advantages of adding calcium carbonate in hot water type processes, two additional runs were made using the process described in example 3. For these runs, the bituminous sand used comprised 11.53 weight percent bitumen, 3.37 weight percent water and 84.75 weight percent solids and had a pH of 8.25. In the first run, no additives were used and 66.4 percent of the bitumen was recovered in the froth. The froth also contained 14.3 pounds of solids per hundred pounds of bitumen and 36.8 pounds of water per hundred pounds of bitumen. On the second run, 0.07 weight percent calcium carbonate was added to the slurry and bitumen recovery increased to 72.7 percent with the froth containing only 10.7 pounds of solids per hundred pounds of bitumen and 34.2 pounds of water per hundred pounds of bitumen.

From the above examples, it can be seen that the addition of calcium carbonate increased recovery of oil even when the pH was at the reasonably good level of 8.25 to start with. When initial pH was low, as in example 3, addition of calcium carbonate resulted in recovering almost twice as much bitumen than where the calcium carbonate was not used.

While the invention has been described above with respect to certain preferred embodiments thereof, it will be understood by those skilled in the art that various changes and modifications can be made without departing from the spirit and scope of the invention.

I claim:

1. In a process for the recovery of bitumen from bituminous sand in which bituminous sand is slurried with a fluid, the resulting slurry is introduced into a separation zone containing a body of water and bitumen is floated to the top of such body of water and recovered therefrom in the form of a bituminous emulsion, the improvement which comprises introducing calcium carbonate into the process in amounts from about 0.01 to about 1.0 percent by weight, based on the total weight of bituminous sand.

2. The process of claim 1 in which the concentration of calcium carbonate is from about 0.02 to about 0.1 percent by weight.

3. The process of claim 1 in which the calcium carbonate is introduced during the fluid slurrying.

4. The process of claim 1 in which the calcium carbonate is added to the bituminous sand at least 1 week before the bituminous sand is slurried.

5. The process of claim 1 in which the slurrying fluid is water.

6. In a process for the recovery of bitumen from bituminous sand in which a bituminous sand deposit originally covered with overburden is exposed to the atmosphere and then at a later date such bituminous sand is slurried with a fluid, the resulting slurry being introduced into a separation zone containing a body of water with bitumen floating to the top of such body of water and being recovered therefrom in the form of a bituminous emulsion, the improvement which comprises adding calcium carbonate to the bituminous sand subsequent to removal of overburden from the bituminous sand but at least 1 week prior to the slurrying of the bituminous sand with the fluid.

7. The process of claim 6 in which calcium carbonate is added to the upper portion of the deposit of bituminous sand in amounts between about 0.01 and about 1.0 pound of calcium carbonate per square foot of surface area of the exposed deposit.

8. The process of claim 7 in which calcium carbonate is distributed on the surface of the bituminous sand within one month from the time the overburden is removed from the bituminous sand.

9. The process of claim 8 in which the calcium carbonate is in the form of particles of limestone of a size between about one-eighth inch and about 1 inch.

* * * * *